United States Patent
Lee et al.

(10) Patent No.: US 7,596,562 B2
(45) Date of Patent: Sep. 29, 2009

(54) SYSTEM AND METHOD FOR MANAGING ACCESS CONTROL LIST OF COMPUTER SYSTEMS

(75) Inventors: Chung-I Lee, Taipei Hsien (TW); Chien-Fa Yeh, Taipei Hsien (TW); Liang-Pu Li, Shenzhen (CN); Wei-Qing Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 234 days.

(21) Appl. No.: 11/560,845

(22) Filed: Nov. 17, 2006

(65) Prior Publication Data

US 2007/0174283 A1     Jul. 26, 2007

(30) Foreign Application Priority Data

Jan. 24, 2006     (CN)     ......................... 2006 1 0033481

(51) Int. Cl.
*G06F 17/30* (2006.01)
(52) U.S. Cl. ............................................. 707/9; 707/1
(58) Field of Classification Search ................ 707/1, 707/9, 10, 100; 700/237; 705/18; 713/183, 713/184
See application file for complete search history.

(56) References Cited

U.S. PATENT DOCUMENTS

| | | | |
|---|---|---|---|
| 6,295,605 | B1 | 9/2001 | Dockter et al. |
| 7,114,076 | B2 * | 9/2006 | Callaghan .................... 713/182 |
| 2003/0083933 | A1 * | 5/2003 | McAlear ....................... 705/14 |
| 2004/0243477 | A1 * | 12/2004 | Mathai et al. .................. 705/26 |
| 2005/0036611 | A1 * | 2/2005 | Seaton et al. .................. 380/44 |

FOREIGN PATENT DOCUMENTS

| | | |
|---|---|---|
| CN | 200310109481.1 | 11/2004 |
| CN | 200310117683.0 | 7/2005 |

* cited by examiner

*Primary Examiner*—Cheryl Lewis
(74) *Attorney, Agent, or Firm*—Wei Te Chung

(57) ABSTRACT

A method for managing access control list of computer systems includes the steps of receiving a user account login request of accessing an application system; validating the user account login request; obtaining a user access list of the user account from the database server if the user account login request is valid; loading the user access list of the user account in the management server temporarily, and creating a user identification; granting access rights to the user account to the application system according to the access list of the user account. A related system is also disclosed.

5 Claims, 3 Drawing Sheets

SYSTEM AND METHOD FOR MANAGING ACCESS CONTROL LIST OF COMPUTER SYSTEMS

BACKGROUND OF THE INVENTION

1. Field of the Invention

The present invention relates to a system and method for managing access control list of computer systems.

2. General Background

Generally speaking, a distributed system is formed by many sub-systems, each sub-system has different system administrators. Different administrators of different sub-systems create their own user access control list, and the format of the user access control list, the naming convention of accounts, the access rights of the user accounts, and so on are all different. When a user requests to access a system, a user logins with a corresponding user account according to a desired system privilege. But, if every sub-system has its user access control list, the management and maintenance of the sub-systems would be very complex. For example, users need to remember larger user name and password and select proper access control list to access corresponding sub-system.

What is needed, therefore, is a system and method for managing access control list of computer systems which can manage one or more system user access lists in a unified way.

SUMMARY

A system for managing access control list of computer systems is provided. The system includes at least one client computer, a database server, and a management server connected with the at least one client computer and the database server. The management server has a user access list manager module which includes a receiving sub-module for receiving a user account login request of accessing an application system; a determining sub-module for validating the user account login request; an obtaining sub-module for obtaining a user access list of the user account from the database server if the user account login request is valid; an updating sub-module for loading the user access list of the user account in the management server temporarily, and creating a user identification; an operating sub-module for granting access rights to the user account to the application system according to the access list of the user account.

A method for managing access control list of computer systems includes the steps of receiving a user account login request of accessing an application system; validating the user account login request; obtaining a user access list of the user account from the database server if the user account login request is valid; loading the user access list of the user account in the management server temporarily, and creating a user identification; granting access rights to the user account to the application system according to the access list of the user account.

Other advantages and novel features of the present invention will become more apparent from the following detailed description of preferred embodiments when taken in conjunction with the accompanying drawings.

DETAILED DESCRIPTION OF THE INVENTION

Figure 1:
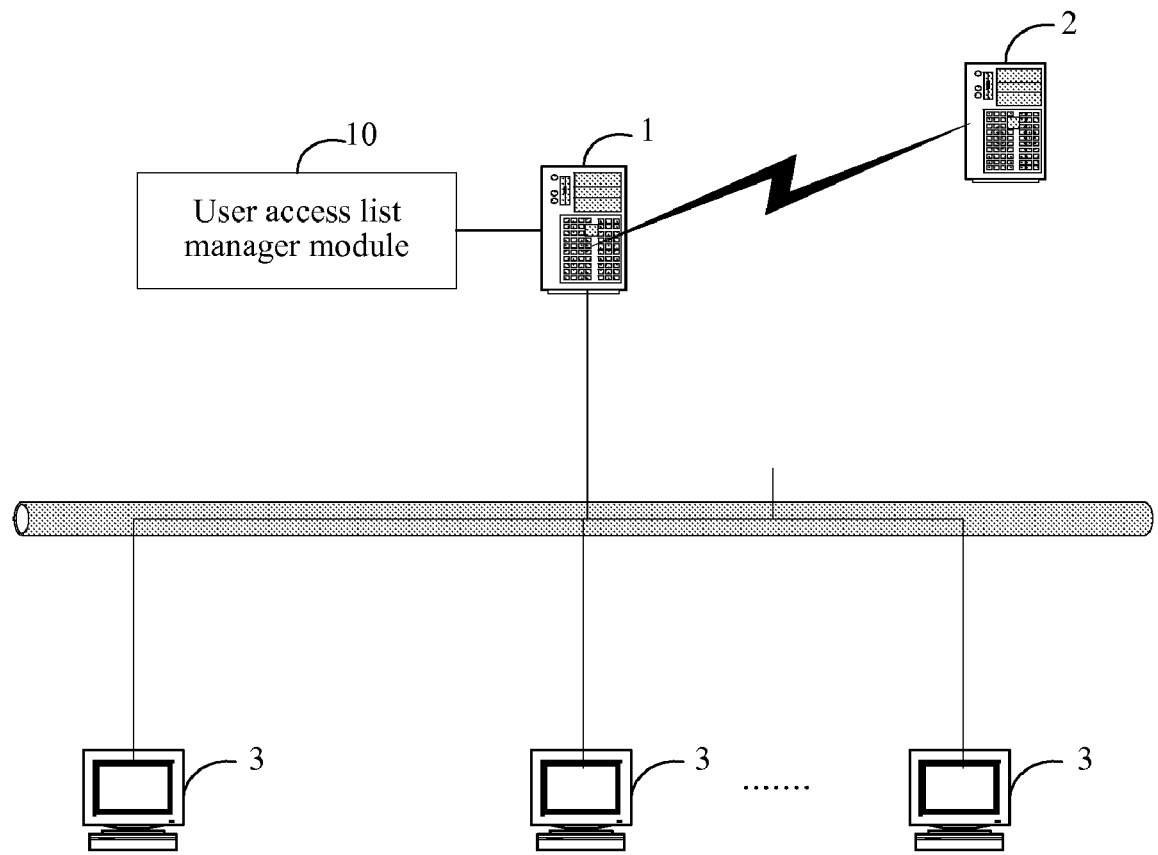
FIG. 1 is a schematic diagram of hardware configuration of a system for managing access control list of computer systems in accordance with a preferred embodiment.

FIG. 1 is a schematic diagram of hardware configuration of a system for managing an access control list of computer systems (hereinafter, "the system") in accordance with a preferred embodiment. The system includes a plurality of client computers 3, a database server 2 for storing user access lists, and a management server 1 linked with the client computer 3 and database server 2. The management server 1 includes a user access list manager module 10, for validating the user access lists.

Figure 2:
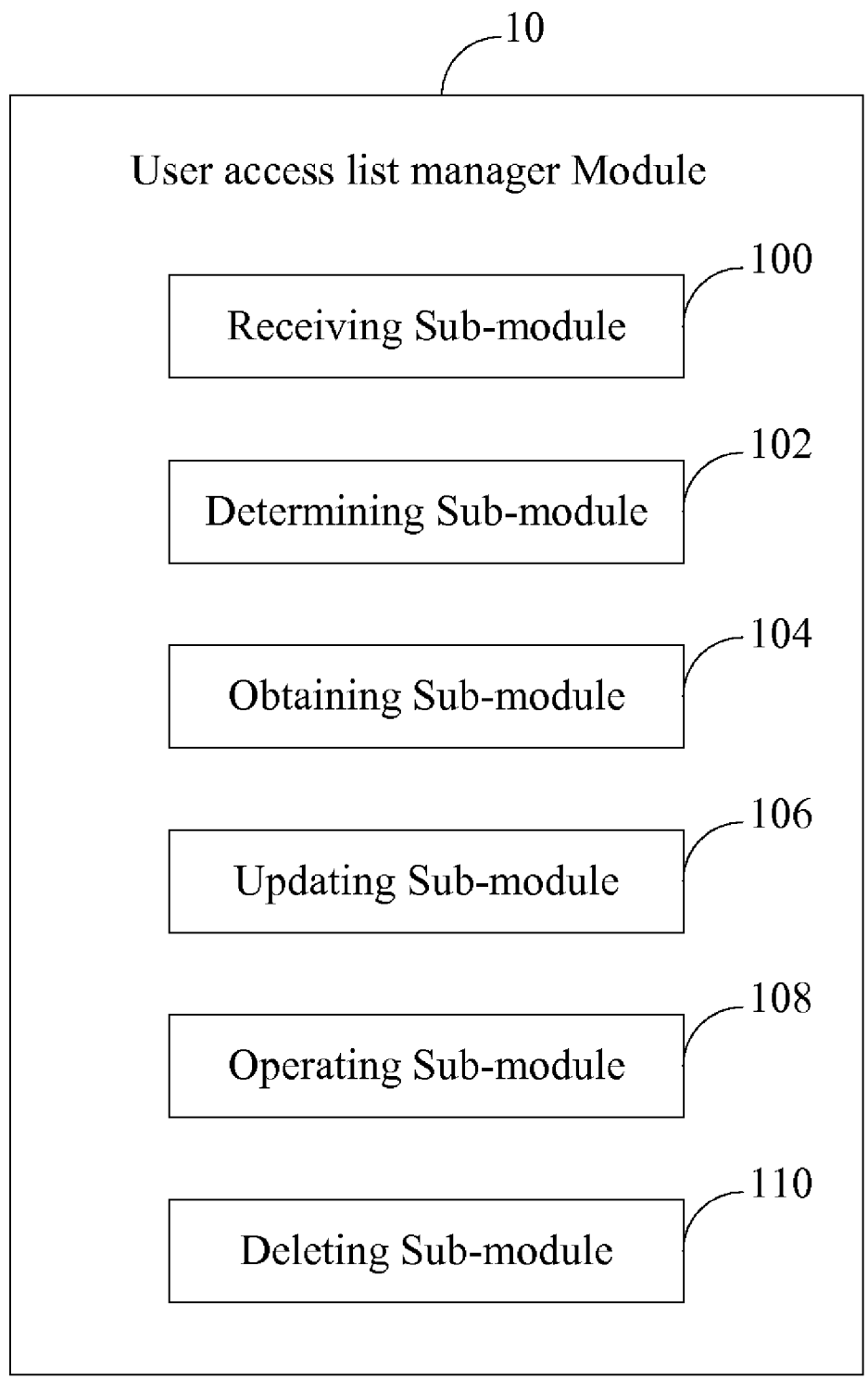
FIG. 2 is a schematic diagram of main function units of a user access list manager module of FIG. 1.

FIG. 2 is a schematic diagram of main function units of the user access list manager module 10. The user access list manager module 10 includes a receiving sub-module 100, a determining sub-module 102, an obtaining sub-module 104, an updating sub-module 106, an operating sub-module 108, and a deleting sub-module 110.

The receiving sub-module 100 is programmed for receiving a user account login request through one of the client computers 3 to access an application system. The management of the user account login request adopts a namespace method. Namespace is an IP address range, which can avoid user access list repetition in systems.

The determining sub-module 102 is programmed for validating the user account login request. If the user account login request provides a correct username/password matching pair as stored in the access list, the determining sub-module 102 determines the user account login request is valid; otherwise, the user account login request is not valid.

The determining sub-module 102 is also used for determining whether the access list of the user account has access rights to other application systems. If the access list of the user account in the management server 1 has the access rights to the other application systems, the determining sub-module 102 validates the user account login request to the other application system; If the access list of the user account in the management server 1 does not have the access rights to the other application systems, the determining sub-module 102 denies the user account login request to the other application system.

The obtaining sub-module 104 is programmed for obtaining a user access list of the user account from the database server 2 if the determining sub-module 102 validates the user account login request. Typically, the access list determines privileges of the user account on every application system, these privileges may be the right to access the application system, the right to print documents in the application system, the right to inquire about user information, or the right to amend the user information.

The updating sub-module 106 is programmed for loading the user access list of the user account obtained by obtaining sub-module 104 in the management server 1 temporarily, and creating a user identification. The user ID identifies whether the user is online or not, and is used as a basis for inquiring about the user access lists.

The operating sub-module 108 is programmed for granting access rights to the user account to the application system according to the access list of the user account if user account login request by the user is valid.

The deleting sub-module 110 is programmed for removing the user access list of the user account from the management server 1 when the user logouts from the application system.

Figure 3:
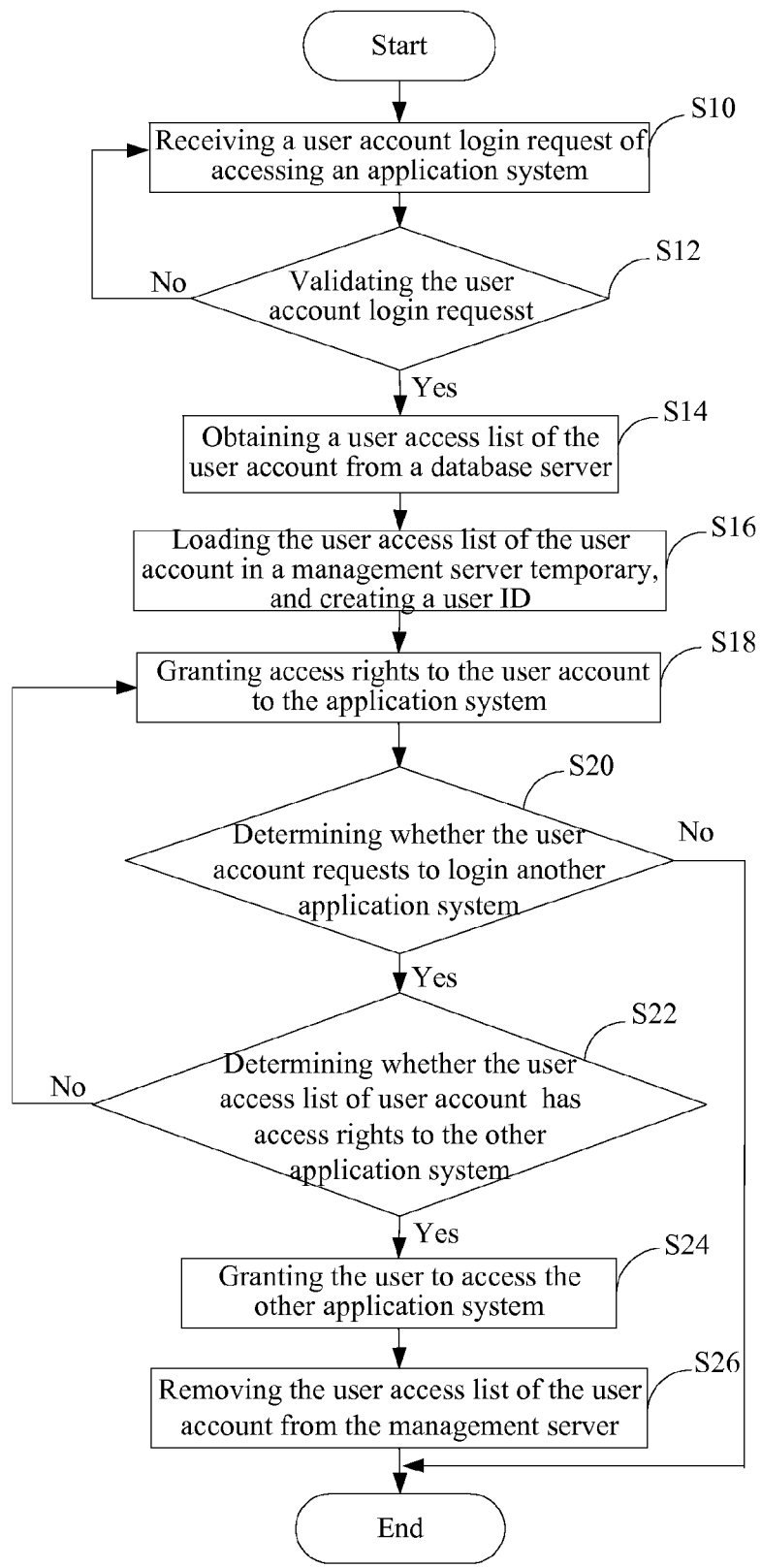
FIG. 3 is a flowchart of a method for managing access control list of computer systems in accordance with a preferred embodiment.

FIG. 3 is a flowchart of a method for managing access control list of computer systems by utilizing the system of FIG. 1 in accordance with a preferred embodiment. In step S10, the receiving sub-module 100 receives a user account login request to an application system.

In step S12, the determining sub-module 102 validates the user account login request. If the determining sub-module 102 validates the user account login request, in step S14, the obtaining sub-module 104 obtains a user access list of the user account from the database server 2. Otherwise, if the user account login request is not valid, determining sub-module 102 denies the user account login request, and the procedure returns to step S10 described above.

In step S16, the updating sub-module 106 loads the user access list of the user account to the management server 1, and creates a user ID. In step S18, the operating sub-module 108 grants access rights to the user account to the application system according to the access list of the user account.

In step S20, the determining sub-module 102 determines whether the user account requests to login to other application systems. If no request is made to request to the other application system, the procedure ends.

Otherwise, in step S22, the determining sub-module 102 determines whether the user access list of the user account has access rights to the other application systems.

If the access list of the user account has access rights to the other application systems, in step S24, the operating sub-module 108 grants the user to access the other application systems.

Otherwise, if access list of the user account does not have access rights to the other application systems, the procedure returns to step S18 described above.

In step S26, the deleting sub-module 110 removes the user access list of the user account from the management server 1 when the user logouts from the application system.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system for managing access control list of computer systems, the system comprising at least one client computer, a database server, and a management server connected with the at least one client computer and the database server, the management server having a user access list manager module, the user access list manager module comprising:

a receiving sub-module for receiving a user account login request of accessing an application system;

a determining sub-module for validating the user account login request;

an obtaining sub-module for obtaining a user access list of the user account from the database server if the user account login request is valid;

an updating sub-module for loading the user access list of the user account in the management server temporarily, and creating a user identification for identifying whether the user is online or not; and an operating sub-module for granting access rights to the user account to the application system according to the access list of the user account, and for granting the user access to the other application system upon the condition that the user access list of the user account has access rights to the other application system.

2. The system as claimed in claim 1, wherein the determining sub-module is further programmed for determining whether the user account requests to login another application system, and determining whether the access list of the user account has access rights to another application system.

3. The system as claimed in claim 1, wherein the user access list manager module further comprises:

a deleting sub-module for removing the user access list of the user account from the management server when user logouts from the application system.

4. A method for managing access control list of computer systems, comprising the steps of:

receiving a user account login request of accessing an application system;

validating the user account login request;

obtaining a user access list of the user account from the database server if the user account login request is valid;

loading the user access list of the user account in the management server temporarily, and creating a user identification for identifying whether the user is online or not;

granting access rights to the user account to the application system according to the access list of the user account; and granting the user access to the other application system upon the condition that the user access list of the user account has access rights to the other application systems.

5. The method according to claim 4, further comprising the step of:

removing the user access list of the user account from the management server when the user logouts from the application system.

\* \* \* \* \*